United States Patent
Chen et al.

(10) Patent No.: US 11,300,821 B2
(45) Date of Patent: Apr. 12, 2022

(54) METHOD FOR MANUFACTURING A DISPLAY SUBSTRATE COMPRISING FORMING A PLANARIZATION LAYER HAVING A HYDROPHILIC MATERIAL AND A HYDROPHOBIC MATERIAL MIXED IN A HOST MATERIAL, DISPLAY SUBSTRATE, AND DISPLAY APPARATUS

(71) Applicants: HEFEI XINSHENG OPTOELECTRONICS TECHNOLOGY CO., LTD., Anhui (CN); BOE TECHNOLOGY GROUP CO., LTD., Beijing (CN)

(72) Inventors: Yan Chen, Beijing (CN); Guohua Wang, Beijing (CN); Xing Su, Beijing (CN)

(73) Assignees: BOE TECHNOLOGY GROUP CO., LTD., Beijing (CN); HEFEI XINSHENG OPTOELECTRONICS TECHNOLOGY CO., LTD., Anhui (CN)

( * ) Notice: Subject to any disclaimer, the term of this patent is extended or adjusted under 35 U.S.C. 154(b) by 311 days.

(21) Appl. No.: 16/618,239

(22) PCT Filed: May 31, 2019

(86) PCT No.: PCT/CN2019/089552
§ 371 (c)(1),
(2) Date: Nov. 29, 2019

(87) PCT Pub. No.: WO2020/155495
PCT Pub. Date: Aug. 6, 2020

(65) Prior Publication Data
US 2021/0364848 A1    Nov. 25, 2021

(30) Foreign Application Priority Data
Feb. 1, 2019 (CN) .......................... 201910103741.5

(51) Int. Cl.
G02F 1/1333 (2006.01)
G02F 1/13 (2006.01)
G02F 1/1339 (2006.01)
G02F 1/1335 (2006.01)

(52) U.S. Cl.
CPC ...... *G02F 1/133357* (2021.01); *G02F 1/1316* (2021.01); *G02F 1/13398* (2021.01); *G02F 1/133512* (2013.01); *G02F 2202/022* (2013.01)

(58) Field of Classification Search
CPC ............ G02F 1/133357; G02F 1/1316; G02F 2202/022
See application file for complete search history.

(56) References Cited

U.S. PATENT DOCUMENTS

2009/0268136 A1*  10/2009  Palto .................... G02B 5/3083
                                                        349/118
2011/0211147 A1*   9/2011  Kim .................... G02F 1/13394
                                                        349/106
(Continued)

FOREIGN PATENT DOCUMENTS

CN            1773314 A       5/2006
CN          105047831 A      11/2015
(Continued)

OTHER PUBLICATIONS

Office Action dated Nov. 24, 2020, issued in counterpart CN Application No. 201910103741.5, with English translation (10 pages).
(Continued)

*Primary Examiner* — Paul C Lee
(74) *Attorney, Agent, or Firm* — WHDA, LLP

(57) ABSTRACT

The present disclosure relates to a method of preparing a display substrate. The method may include forming a pattern layer on a base substrate; forming a planarization layer on the pattern layer, the planarization layer comprising a host
(Continued)

material and a hydrophilic material and a hydrophobic material mixed in the host material; treating the planarization layer so that the host material reacts with the hydrophilic material to form a hydrophilic polymer, the host material reacts with the hydrophobic material to form a hydrophobic polymer, and the planarization layer is delaminated to form a first sub-planarization layer and a second sub-planarization layer; and cleaning the planarization layer with a cleaning solution that reacts with the hydrophobic polymer to remove at least part of the first sub-planarization layer. The first sub-planarization layer includes the hydrophobic polymer, and the second sub-planarization layer includes the hydrophilic polymer.

17 Claims, 6 Drawing Sheets

(56) References Cited

U.S. PATENT DOCUMENTS

| | | | | |
|---|---|---|---|---|
| 2011/0241219 | A1* | 10/2011 | Nakazawa | H01L 27/1214 257/774 |
| 2015/0029429 | A1* | 1/2015 | Choi | H01L 29/41733 349/43 |
| 2015/0205159 | A1* | 7/2015 | Itou | G02F 1/133617 349/110 |
| 2016/0077365 | A1* | 3/2016 | Park | G02F 1/133711 349/42 |
| 2019/0103452 | A1 | 4/2019 | Jia et al. | |

FOREIGN PATENT DOCUMENTS

| | | |
|---|---|---|
| CN | 107731872 A | 2/2018 |
| CN | 107968105 A | 4/2018 |
| CN | 207250517 U | 4/2018 |
| CN | 109103221 A | 12/2018 |
| CN | 109581721 A | 4/2019 |
| KR | 2003-0054906 A | 7/2003 |

OTHER PUBLICATIONS

International Search Report dated Nov. 4, 2019, issued in counterpart application No. PCT/CN2019/089552. (9 pages).

Office Action dated Apr. 3, 2020, issued in counterpart CN application No. 201910103741.5, with English translation (11 pages).

* cited by examiner

Related Art

METHOD FOR MANUFACTURING A DISPLAY SUBSTRATE COMPRISING FORMING A PLANARIZATION LAYER HAVING A HYDROPHILIC MATERIAL AND A HYDROPHOBIC MATERIAL MIXED IN A HOST MATERIAL, DISPLAY SUBSTRATE, AND DISPLAY APPARATUS

CROSS-REFERENCE TO RELATED APPLICATION

This application claims benefit of the filing date of Chinese Patent Application No. 201910103741.5 filed on Feb. 1, 2019, the disclosure of which is hereby incorporated in its entirety by reference.

TECHNICAL FIELD

The present disclosure relates to the field of display technology, and in particular, to a method for manufacturing a display substrate, a display substrate and a display apparatus.

BACKGROUND

With rapid development of display technology, the black matrix pattern and the color photoresist pattern in the current display panel may be disposed on different substrates, or the display panel includes only the black matrix pattern, but not the color resist pattern.

BRIEF SUMMARY

One embodiment of the present disclosure provides a method of preparing a display substrate. The method of preparing a display substrate may include forming a pattern layer on a base substrate; forming a planarization layer on the pattern layer, the planarization layer comprising a host material and a hydrophilic material and a hydrophobic material mixed in the host material; treating the planarization layer so that the host material reacts with the hydrophilic material to form a hydrophilic polymer, the host material reacts with the hydrophobic material to form a hydrophobic polymer, and the planarization layer being delaminated to form a first sub-planarization layer and a second sub-planarization layer; and cleaning the planarization layer with a cleaning solution that reacts with the hydrophobic polymer to remove at least part of the first sub-planarization layer. The first sub-planarization layer comprises the hydrophobic polymer, and the second sub-planarization layer comprises the hydrophilic polymer.

Optionally, the first sub-planarization layer is stacked on the second sub-planarization layer, and the second sub-planarization layer is closer to the base substrate than the first sub-planarization layer.

Optionally, a thickness of the second sub-planarization layer is greater than or equal to a thickness of the pattern layer.

Optionally, before the planarization layer is cleaned with the cleaning solution, a ratio of a maximum thickness of the second sub-planarization layer and a maximum thickness of the first sub-planarization layer is about 1:4.

Optionally, the planarization layer is formed on the pattern layer by a coating technique.

Optionally, the host material comprises polyimide.

Optionally, the hydrophilic material includes a carboxyl group.

Optionally, the hydrophilic polymer has a molecular structure as follows:

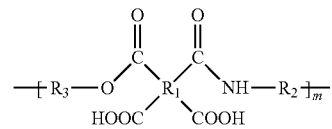

wherein m is an integer, and m≥2, $R_1$, $R_2$, and $R_3$ have a chemical structure as below:

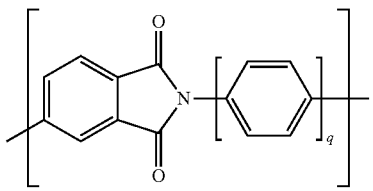

wherein q is an integer in a range of 1 to 8.

Optionally, the hydrophobic material includes an alkyl group.

Optionally, the hydrophobic polymer has a molecular structure as follows:

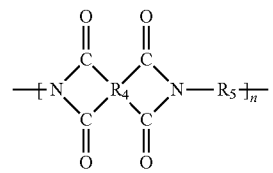

wherein n is an integer and n≥2, $R_4$ and $R_5$ have a chemical structure as below:

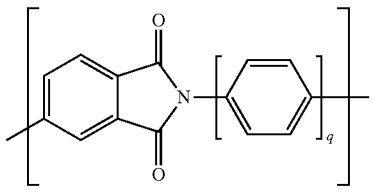

wherein q is an integer in a range of 1 to 8.

Optionally, treating the planarization layer comprises heating the planarization layer at a temperature within a range from about 210° C. to about 250° C.

Optionally, the cleaning solution comprises sodium dodecyl benzene sulfonate.

Optionally, the hydrophilic material and the hydrophobic material are randomly distributed in the host material Optionally, the pattern layer comprises a black matrix pattern, and after the planarization layer is cleaned with the cleaning solution that reacts with the hydrophobic polymer to remove at least part of the first sub-planarization layer, the method of preparing the display substrate further comprises forming a photo spacer. A boundary of orthographic projection of the photo spacer on the base substrate is within a boundary of orthographic projection of the black matrix pattern on the base substrate.

Optionally, the method of preparing a display substrate further comprises, before forming the pattern layer on the base substrate, forming a transparent conductive film on the base substrate.

One embodiment of the present disclosure includes a display substrate prepared by the method for preparing a display substrate according to one embodiment of the present disclosure.

One embodiment of the present disclosure is a display apparatus, comprising the display substrate according to one embodiment of the present disclosure.

BRIEF DESCRIPTION OF THE DRAWINGS

The subject matter which is regarded as the disclosure is particularly pointed out and distinctly claimed in the claims at the conclusion of the specification. The foregoing and other objects, features, and advantages of the present disclosure are apparent from the following detailed description taken in conjunction with the accompanying drawings in which:

DETAILED DESCRIPTION

Figure 1:
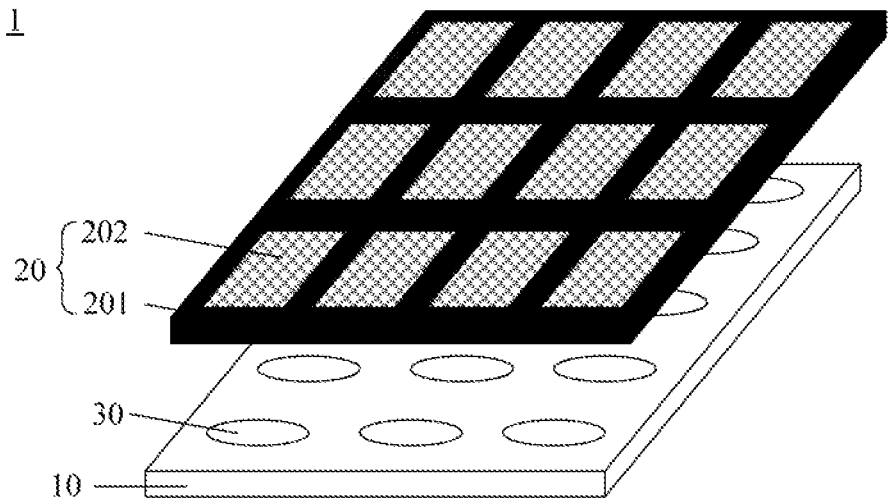
FIG. 1 is a schematic structural view of a Normal Cell provided by the related art.

In order to make the objects, technical solutions, and advantages of the embodiments of the present disclosure more apparent, the technical solutions according to the embodiments of the present disclosure will be described below clearly and fully with reference to the drawings, but the embodiments described below are only particular embodiments, which are not intended to represent all embodiments of the present disclosure. Based upon the embodiments in the present disclosure, other embodiments which will be apparent to those skilled in the art are within the scope of the present disclosure.

When an element and an embodiment of the present disclosure are introduced, the articles "a", "an", "the" and "said" are intended to indicate that one or more elements are present. The terms "comprising", "including", "containing" and "having" are intended to be inclusive and mean that there may be additional elements other than the listed elements.

For the purpose of surface description hereinafter, as direction-calibrated in the accompanying drawings, the terms "above", "below", "left", "right", "vertical", "horizontal", "top", "bottom" and derivatives thereof shall relate to the present disclosure. The terms "covered with", "on top of", "positioned on", or "positioned on top of" mean that, for example, a first element of a first structure is on a second element of a second structure, wherein an intermediate element such as an intermediate structure may exist between the first element and the second element. The term "contact" means that, for example, the first element of the first structure and the second element of the second structure are connected directly or indirectly, and other elements may exist or not exist at the interface between the two elements.

Unless otherwise defined, all the terms (including the technical and scientific terms) used herein have the same meanings as commonly understood by one of ordinary skill in the art to which the present disclosure is directed. It is also understood that the terms such as defined in the usual dictionary should be interpreted as having the same meanings as the meaning in the context of the relevant technology. The terms should not be interpreted as an idealization or as having extreme meanings, unless they are explicitly defined herein. As employed herein, the statement that two or more parts are "connected" or "coupled" together shall mean that the parts are joined together either directly or joined through one or more intermediate parts.

In the description of the present disclosure, the terms "center," "horizontal," "vertical," "length," "width," "thickness," "upper," "lower," "front," "back." "left," "right," "top," "bottom," "inner," "outer," or the like are based on the orientation or positional relationship shown in the drawings. They are used merely for convenience of description and simplifying description of the present invention, but not to indicate or imply that the indicated apparatus or element must have a specific orientation, or be constructed and operated in a specific orientation, therefore cannot be construed as a limitation of the present disclosure.

In addition, the terms "first" and "second" or the like are for illustration purposes only and are not to be construed as indicating or implying relative importance or implied reference to the quantity of indicated technical features. Thus, features defined by the terms "first" and "second" may explicitly or implicitly include one or more of the features. In the description of the present disclosure, the meaning of "plural" is two or more unless otherwise specifically and specifically defined.

A numerical range modified by "about" herein means that the upper and lower limits of the numerical range can vary by 10% thereof. A numeric value modified by "about" herein means that the numeric value can vary by 10% thereof.

Figure 2:
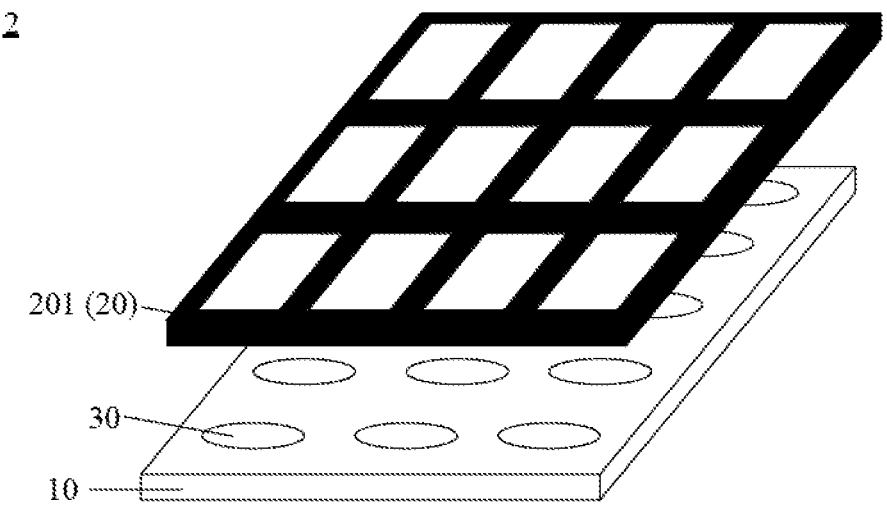
FIG. 2 is a schematic structural view of a Mono Cell provided by the related art.

A Dual Cell display device may be composed of a Normal Cell 1 (conventional liquid crystal display panel) as shown in FIG. 1 and a Mono Cell 2 (unconventional liquid crystal display panel) as shown in FIG. 2.

The Normal Cell 1 is used for normal color image display. As shown in FIG. 1, the Normal Cell 1 may include an array substrate 10, a counter substrate 20, and a liquid crystal layer 30 disposed between the array substrate 10 and the counter substrate 20. The counter substrate 20 includes a black matrix pattern (BM) 201 and a color photoresist pattern 202 such as red photoresist pattern (R), green photoresist pattern (G), and blue photoresist pattern (B).

The Mono Cell 2 is used for area brightness adjustment. As shown in FIG. 2, the Mono Cell 2 may include an array substrate 10, a counter substrate 20, and a liquid crystal layer 30 disposed between the array substrate 10 and the counter substrate 20. The counter substrate 20 includes a black matrix pattern 201, but does not include a color photoresist pattern.

Figure 3:
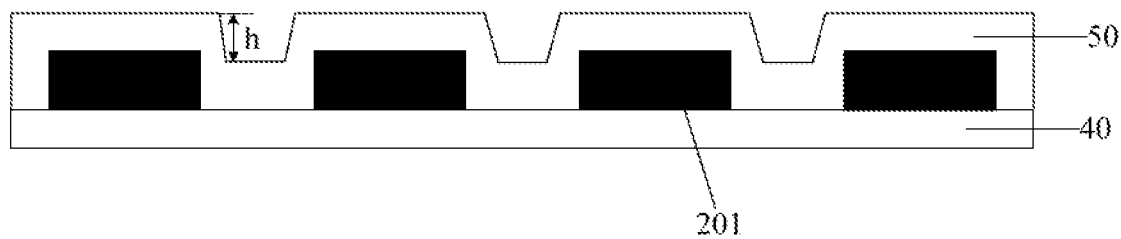
FIG. 3 is a schematic structural diagram of a counter substrate in a Mono Cell provided by the related art.
Figure 4:
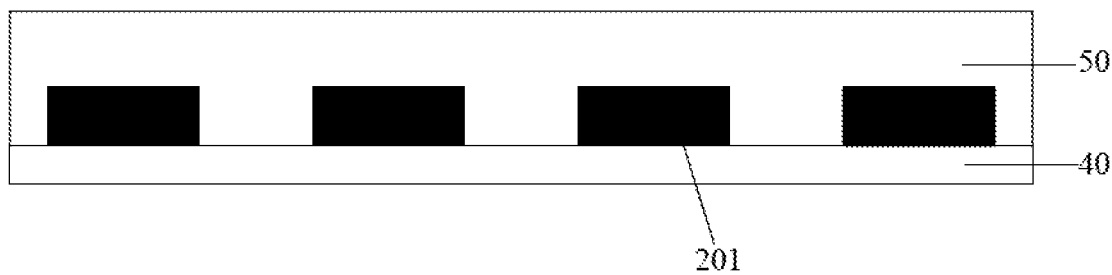
FIG. 4 is a schematic structural diagram of a counter substrate in another Mono Cell provided by the related art.

As shown in FIG. 3, the counter substrate 20 in the Mono Cell 2 includes a black matrix pattern 201 disposed on the base substrate 40. Since the counter substrate 20 does not include a color photoresist pattern, it is formed on the black matrix pattern 201. When a planarization layer (Over Coat) 50 is formed on the black matrix pattern 201, a surface of the planarization layer has very large step difference h, which may be about 10 times or more of the step difference of the planarization layer 50 when the color photoresist pattern is provided. As such, the risk of Rubbing Mura is easily generated. In order to solve the problem of large step difference, as shown in FIG. 4, evenness is often increased by increasing the thickness of the planarization layer 50. However, after the thickness of the planarization layer is increased, the difficulty of gas evolution from the planarization layer 50 in the subsequent evacuation process is increased, thereby increasing the risk of bubble in the product. If the vacuuming time is increased to ensure the quality of the product, the vacuuming time is exponentially related to the thickness of the planarization layer 50, which greatly reduces the productivity.

Figure 5:
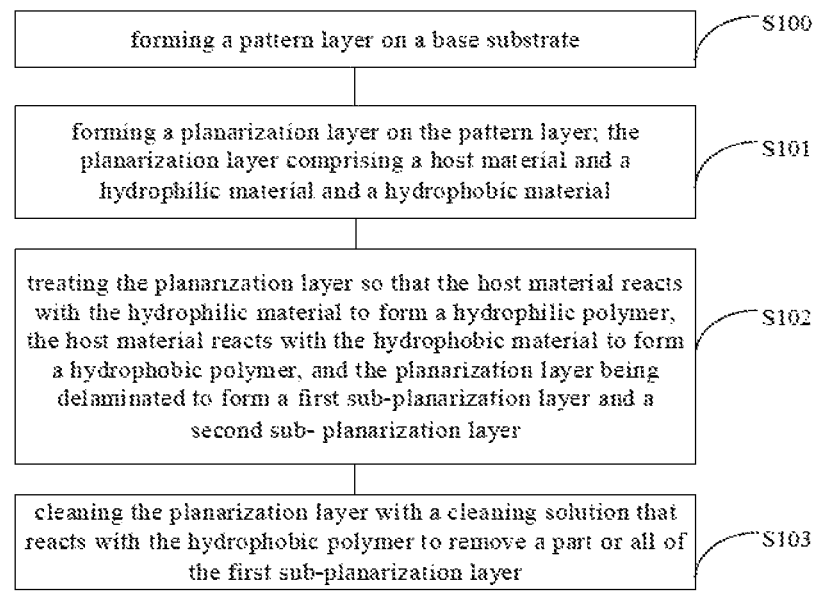
FIG. 5 is a schematic flowchart of a method for preparing a display substrate according to one embodiment of the present disclosure.

One embodiment of the present disclosure provides a method for preparing a display substrate, as shown in FIG. 5, comprising steps S100-S103.

Figure 6:
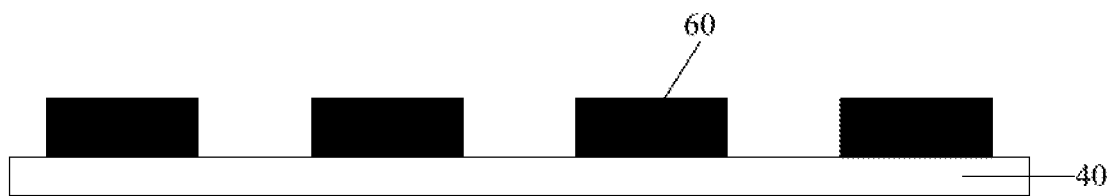
FIG. 6 is a schematic structural diagram of forming a pattern layer on a base substrate according to one embodiment of the present disclosure.

As shown in FIG. 6, step S100 includes forming a pattern layer 60 on a base substrate 40.

The pattern layer 60 includes a convex portion and a concave portion (or a hollow portion), and a surface of the pattern layer 60 opposite from the base substrate 40 is uneven.

The pattern layer 60 includes, but is not limited to, a black matrix pattern.

The material of the base substrate 40 is not limited and may be, for example, glass.

The method of forming the pattern layer 60 on the base substrate 40 is not limited. For example, a film may be formed on the base substrate 40, and then the film may be patterned to form the pattern layer 60. Patterning includes mask exposure and development, or mask exposure, development and etching.

Figure 7:
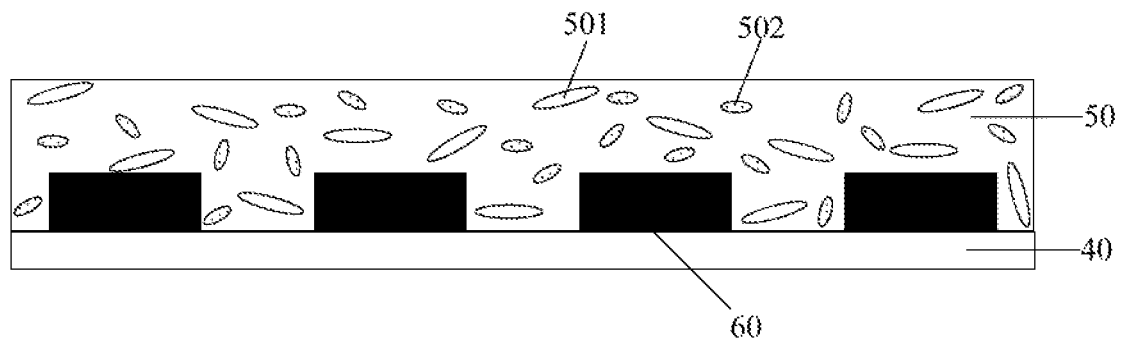
FIG. 7 is a schematic structural diagram of forming a planarization layer on a pattern layer according to one embodiment of the present disclosure.

As shown in FIG. 7, step S101 includes forming a planarization layer on the pattern layer 60. The material of the planarization layer 50 includes a host material and a hydrophilic material 501 and a hydrophobic material 502 mixed in the host material.

Among them, the hydrophilic material 501 has a hydrophilic group, and the hydrophobic material 502 has a hydrophobic group (also referred to as an oily group).

In the embodiment, the planarization layer 50 is formed on the pattern layer 60. Since the material of the planarization layer 50 has fluidity, when the thickness of the planarization layer 50 is sufficiently large, the surface of the planarization layer 50 opposite from the base substrate 40 has no step difference or low step difference. That is, the surface of the planarization layer 50 opposite from the base substrate 40 is even. Based on this, the thickness of the planarization layer 50 formed on the pattern layer 60 is not limited so as to ensure that the surface of the planarization layer 50 opposite from the base substrate 40 has no step difference or low step difference.

The method of forming the planarization layer 50 on the pattern layer 60 is not limited, and the planarization layer 50 may be formed on the pattern layer 60 by, for example, coating or spin coating.

Here, the host material in the material of the planarization layer 50 is not limited, and may be the same as the material of the planarization layer 50 in the prior art. For example, it may be a polymer material such as polyimide (PI).

Examples of the hydrophilic material 501 are not limited, and may include, for example, polyvinyl alcohol, polyacrylamide, polyacrylic acid or the like. Preferably, the hydrophilic material 501 comprises a carboxyl (—COOH) hydrophilic group.

Examples of the hydrophobic material 502 are not limited. The hydrophobic material 502 may include, for example, a hydrocarbon group containing an aryl group, an ester, an ether, an amine, or an amide; a hydrocarbon group having a double bond; a polyoxypropylene group, or the like. Preferably, the hydrophobic material 502 comprises an alkyl hydrophobic group.

It should be understood that after the hydrophilic material 501 and the hydrophobic material 502 are mixed in the host material, as shown in FIG. 7, the hydrophilic material 501 and the hydrophobic material 502 are randomly distributed in the host material.

Figure 8:
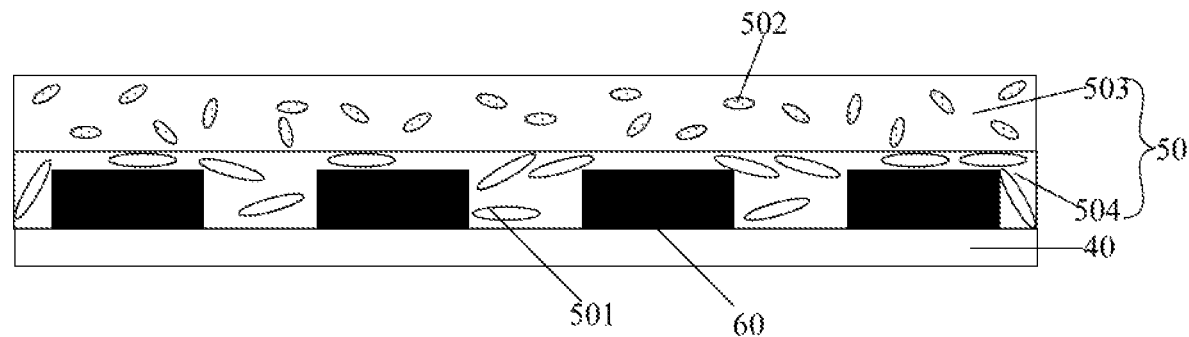
FIG. 8 is a schematic structural diagram of treating a planarization layer to form a first sub-planarization layer and a second sub-planarization layer according to one embodiment of the present disclosure.

As shown in FIG. 8, step S102 includes treating the planarization layer 50 so that the host material reacts with the hydrophilic material 501 to form a hydrophilic polymer, the host material reacts with the hydrophobic material 502 to form a hydrophobic polymer, and accordingly the planarization layer 50 is delaminated to form a first sub-planarization layer 503 and a second sub-planarization layer 504. The first sub-planarization layer 503 is stacked on the second sub-planarization layer 504. The second sub-planarization layer 504 is more adjacent to the base substrate 40 than the first sub-planarization layer 503. The material of the first sub-planarization layer 503 includes the hydrophobic polymer, and the material of the second sub-planarization layer 504 includes the hydrophilic polymer.

Here, the planarization layer 50 may be treated, for example, by heating the planarization layer 50. Specifically, for example, the planarization layer 50 may be pre-baked.

It should be noted that, when the planarization layer 50 is treated, the host material in the material of the planarization layer 50 and the hydrophilic material 501 undergo a chain reaction to form a hydrophilic polymer, that is, a supramolecular chain having a hydrophilic group. Furthermore, the host material in the material of the planarization layer 50 and the hydrophobic material 502 undergo a chain reaction to form a hydrophobic polymer, that is, a supramolecular chain having a hydrophobic group. In addition, since the hydrophilic polymer and the hydrophobic polymer have different solubility, the hydrophobic polymer gradually floats or self-assembles to the upper layer, and the hydrophilic polymer gradually sinks or self-assembles to the lower layer. Accordingly, the planarization layer 50 is delaminated into two layers. After the solvent in the material of the planarization layer 50 is volatilized, a first sub-planarization layer 503 and a second sub-planarization layer 504 are formed. The second sub-planarization layer 504 is more adjacent to the base substrate 40 with respect to the first sub-planarization layer 503. The material of the first sub-planarization layer 503 includes a hydrophobic polymer, and the material of the second sub-planarization layer 504 includes a hydrophilic polymer.

When the planarization layer 50 is heated, the heating temperature is not limited. The heating temperature may be set based on the temperature required for the reaction of the host material and the hydrophilic material 501 in the material of the planarization layer 50 and the reaction of the host material and the hydrophobic material 502 in the material of the planarization layer 50. In some embodiments, the heating temperature ranges from about 210° C. to about 250° C. For example, the heating temperature can be about 230° C.

In some embodiments, when the planarization layer 50 is treated as described above, the reaction of the host material and the hydrophilic material 501, the reaction of the host material and the hydrophobic material 502, the delamination of the planarization layer 50, and the evaporation of the solvent in the material of the planarization layer 50 are all performed simultaneously within the process of treating the planarization layer. In addition, heating is maintained throughout the process.

In some embodiments, in order to ensure that both the hydrophilic material 501 and the hydrophobic material 502 can sufficiently react with the host material when the planarization layer 50 is treated, in step 101, before the planarization layer 50 is formed on the pattern layer 60, the host material, the hydrophilic material 501, and the hydrophobic material 502 in the material of the planarization layer 50 are first uniformly mixed. Then, the planarization layer 50 is formed on the pattern layer 60, for example, by coating.

On the basis of this, when the planarization layer 50 is delaminated to form the first sub-planarization layer 503 and the second sub-planarization layer 504, since the material of the planarization layer 50 has fluidity, the surface of first sub-planarization layer 503 opposite from the base substrate 40 is even. The evenness of the surface of the second sub-planarization layer 504 opposite from the surface of the base substrate 40 is better than the evenness of the surface of the pattern layer 60 opposite from the base substrate 40. Further, in the case where the thickness of the second sub-planarization layer 504 is greater than the thickness of the pattern layer 60, since the material of the planarization layer 50 has fluidity, the surface of the formed second sub-planarization layer 504 opposite from the base substrate 40 is even.

The thicknesses of the first sub-planarization layer 503 and the second sub-planarization layer 504 are not limited. The thicknesses of the first sub-planarization layer 503 and the second sub-planarization layer 504 may be adjusted by adjusting the ratio of the hydrophilic material 501 to the hydrophobic material 502 in the host material of the planarization layer 50.

The hydrophilic polymer formed by reacting the host material with the hydrophilic material 501 is not limited. In some embodiments, the molecular structure of the hydrophilic polymer is:

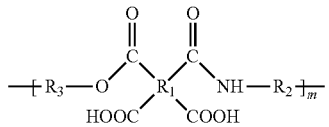

Where m is a positive integer and m≥2. The hydrophilic polymer includes a polyester acyl acid group. $R_1$, $R_2$, and $R_3$ may have similar structures. The molecular structure of $R_1$, $R_2$, and $R_3$ is mainly a rigid branched structure composed of a plurality of benzene rings. The difference among $R_1$, $R_2$, and $R_3$ is mainly the number of benzene rings, the angle and type of branching, etc. In one embodiment, $R_1$, $R_2$, and $R_3$ have a chemical structure as below:

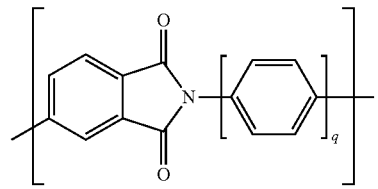

Wherein q is an integer number, and may be different for $R_1$, $R_2$ and $R_3$ respectively. q may be an integer in a range of 1 to 8. For example, q may be 1 for $R_2$, 2 for $R_2$, and 3 for $R_3$.

The hydrophobic polymer formed by reacting the host material with the hydrophobic material 502 is not limited. In some embodiments, the molecular structure of the hydrophobic polymer is:

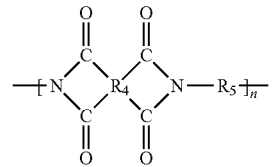

Where n is a positive integer and n≥2. The hydrophobic polymer includes a polyester imine group. $R_4$ and $R_5$ may have similar structures as $R_1$, $R_2$, and $R_3$ including a plurality of benzene rings. The number of benzene rings for $R_4$ and $R_5$ may be different. For example, the number of benzene rings, q, may be 4 for $R_4$, and 5 for $R_5$.

Figure 9A:
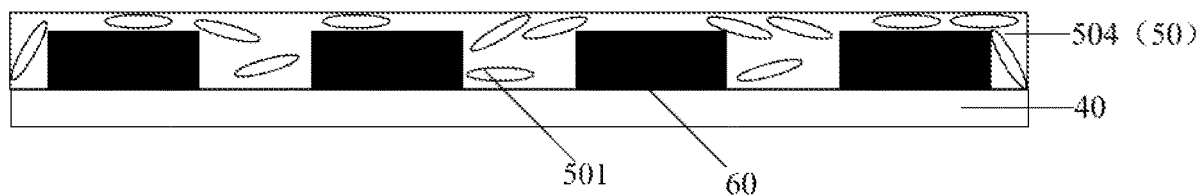
FIG. 9a is a schematic structural diagram of removing an entire first sub-planarization layer according to one embodiment of the present disclosure.
Figure 9B:
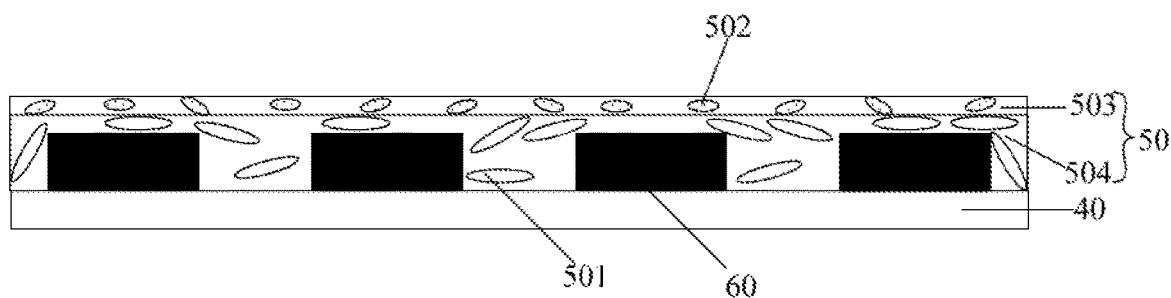
FIG. 9b is a schematic structural diagram of removing a part of a first sub-planarization layer according to one embodiment of the present disclosure.

As shown in FIG. 9a and FIG. 9b, step S103 includes washing the planarization layer 50 with a cleaning solution, and the cleaning solution reacts with the hydrophobic polymer to remove a part or all of the first sub-planarization layer 503.

It should be noted that the cleaning solution reacts only with the hydrophobic polymer and does not react with the hydrophilic polymer. Since the cleaning solution reacts only with the hydrophobic polymer to dissolve the hydrophobic polymer, the cleaning solution removes a part or all of the first sub-planarization layer 503 located in the upper layer, while retaining the second sub-planarization layer 504 located in the lower layer and/or a part of the first sub-planarization layer 503. Since the surface of the planarization layer 50 opposite from the base substrate 40 has no step difference or low step difference, when the first sub-planarization layer 503 is cleaned by the cleaning solution, the cleaning solution uniformly flows on the surface of the first sub-planarization layer 503 opposite from the base substrate 40. As such, after a part of or the entire first sub-planarization layer 503 is removed, the surface of the remaining planarization layer opposite from the base substrate 40 also has no step difference or low step difference. That is, the surface of the remaining planarization layer opposite from the base substrate 40 is also even.

In some embodiments, when the planarization layer 50 is cleaned with the cleaning solution, the first sub-planarization layer 503 is completely removed as shown in FIG. 9a. In other embodiments, when the planarization layer 50 is cleaned with the cleaning solution, a part of the first sub-planarization layer 503 is removed as shown in FIG. 9b. Based on this, the thickness of the first sub-planarization layer 503 to be removed may be determined based on the thickness of the first sub-planarization layer 503, the thickness of the second sub-planarization layer 504, and the finally required thickness of the planarization layer.

Based on the above, when designing the thickness of the first sub-planarization layer 503 and the thickness of the second sub-planarization layer 504, it is considered that if the proportion of the second sub-planarization layer 504 is too small, after the first sub-planarization layer 503 is completely removed, the evenness of the remaining second sub-planarization layer 504 may not be very good. If the proportion of the second sub-planarization layer 504 is too large, the thickness of the remaining second sub-planarization layer 504 may be relatively large after the first sub-planarization layer 503 is completely removed. Therefore, In one embodiment of the present disclosure, before the cleaning solution washes the planarization layer 50, the ratio of the maximum thickness of the second sub-planarization layer 504 to the maximum thickness of the first sub-planarization layer 503 is about 1:4.

It should be noted that, as shown in FIG. 8, after the planarization layer 50 is treated and delaminated to form the stacked first sub-planarization layer 503 and the second sub-planarization layer 504, since the pattern layer 60 is uneven, the second sub-planarization layer 504 formed on the pattern layer 60 is also uneven. When the maximum thickness of the second sub-planarization layer 504 is less than the thickness of the pattern layer 60, the first sub-planarization layer 503 is also uneven. Based on this, when designing the thickness ratio of the first sub-planarization layer 503 and the second sub-planarization layer 504, the ratio of the maximum thickness of the second sub-planarization layer 504 to the maximum thickness of the first sub-planarization layer 503 is designed to be about 1:4.

In some embodiments of the present disclosure, the ratio of the maximum thickness of the second sub-planarization layer 504 and the maximum thickness of the first sub-planarization layer 503 is designed to be about 1:4. On the one hand, it can be ensured that after removing a part of or the entire first sub-planarization layer 503, the surface of the remaining planarization layer opposite from the surface of the substrate 40 is even. On the other hand, it can be ensured that after removing a part of or the entire first sub-planarization layer 503, the remaining planarization layer has a small thickness.

The process that the planarization layer 50 is washed with a cleaning solution, and the cleaning solution reacts with the hydrophobic polymer to remove a part of or the entire first sub-planarization layer 503, includes the following:

The planarization layer 50 is washed with the cleaning solution, and the cleaning solution reacts with the hydrophobic polymer to control the thickness of the remaining first sub-planarization layer 503 by controlling concentration of the cleaning solution and cleaning time.

The greater the concentration of the cleaning solution, the longer the cleaning time, and the smaller the thickness of the remaining first sub-planarization layer 503.

On the basis of this, the composition of the cleaning solution is not limited so long as the cleaning solution can react with the hydrophobic polymer to dissolve the hydrophobic polymer. In one embodiment, the composition of the cleaning solution includes sodium dodecylbenzene sulfonate and/or sodium fatty alcohol ether sulfate. The molecular structure of sodium dodecylbenzene sulfonate is:

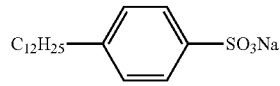

One embodiment of the present disclosure provides a method for preparing a display substrate. When the planarization layer 50 is formed on the pattern layer 60, the thickness of the planarization layer 50 can be set thicker, thereby ensuring that the surface of the planarization layer 50 opposite from the substrate 40 has no step difference or low step difference, that is, ensures that the surface of the planarization layer 50 opposite from the substrate 40 is even. During the treatment of the planarization layer 50, the host material can react with the hydrophilic material 501 to form a hydrophilic polymer, and react with the hydrophobic material 502 to form a hydrophobic polymer. Consequently, the planarization layer 50 is delaminated to form a first sub-planarization layer 503 and a second sub-planarization layer 504 stacked over each other. The second sub-planarization layer 504 is closer to the base substrate 40 with respect to the first sub-planarization layer 503. The material of the first sub-planarization layer 503 comprises the hydrophobic polymer, and the material of the second sub-planarization layer 504 comprises the hydrophilic polymer. When the planarization layer 50 is cleaned by the cleaning solution, the cleaning solution reacts only with the hydrophobic polymer and does not react with the hydrophilic polymer, so that a part of or the entire first sub-planarization layer 503 can be removed. In this way, the surface of the remaining planarization layer 50 opposite from the base substrate 40 can be ensured that there is no step difference or low step difference, that is, the surface of the remaining planarization layer 50 opposite from the substrate 40 is ensured to be even, which reduces the risk of Rubbing Mura. Moreover, the thickness of the planarization layer 50 can be reduced. As such, the risk of bubble in the product is reduced, and the time for vacuuming in the subsequent vacuuming process is reduced, thereby increasing the productivity.

Figure 10:
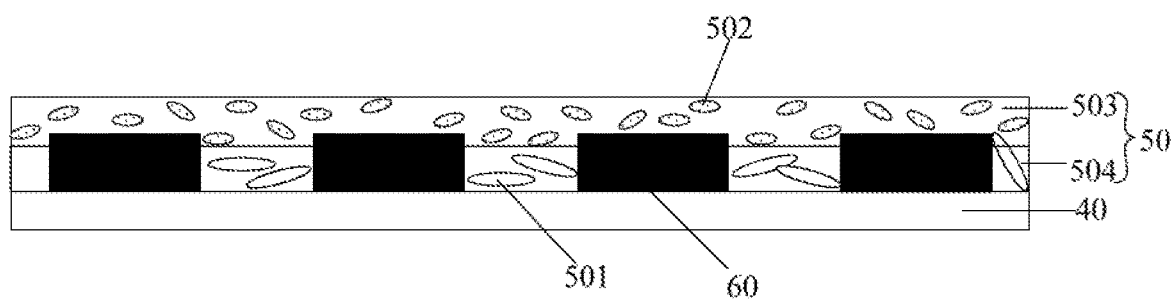
FIG. 10 is a schematic structural diagram of a process for treating a planarization layer to form a first sub-planarization layer and a second sub-planarization layer according to one embodiment of the present disclosure.

Referring to FIG. 10, it is considered that if the thickness of the formed second sub-planarization layer 504 is smaller than the thickness of the pattern layer 60, after the first sub-planarization layer 503 is completely removed, the surface of the display substrate is still uneven. Based on this, in one embodiment of the present disclosure, as shown in FIG. 9b, the thickness of the second sub-planarization layer 504 is greater than or equal to the thickness of the pattern layer 60.

In some embodiments, the thickness of the second sub-planarization layer 504 is greater than the thickness of the pattern layer 60.

Since the thickness of the second sub-planarization layer 504 is greater than the thickness of the pattern layer 60, after the first sub-planarization layer 503 is completely removed, it is ensured that the surface of the display substrate has no step difference or low step difference. Further, when the thickness of the second sub-planarization layer 504 is greater than the thickness of the pattern layer 60, the second sub-planarization layer 504 covers the surface of the pattern layer 60, so that the surface of the display substrate at the position of the corresponding pattern layer 60 can be made even. Thus, the problem that the surface of the pattern layer 60 is uneven during the production of the pattern layer 60 can be solved.

In some embodiments, the thickness of the second sub-planarization layer 504 is equal to the thickness of the pattern layer 60.

In the embodiment of the present disclosure, since the thickness of the second sub-planarization layer 504 is equal to the thickness of the pattern layer 60, after the first sub-planarization layer 503 is completely removed, the surface of the display substrate can be ensured to have no step difference, thereby making the surface of the display substrate to be even.

Figure 11:
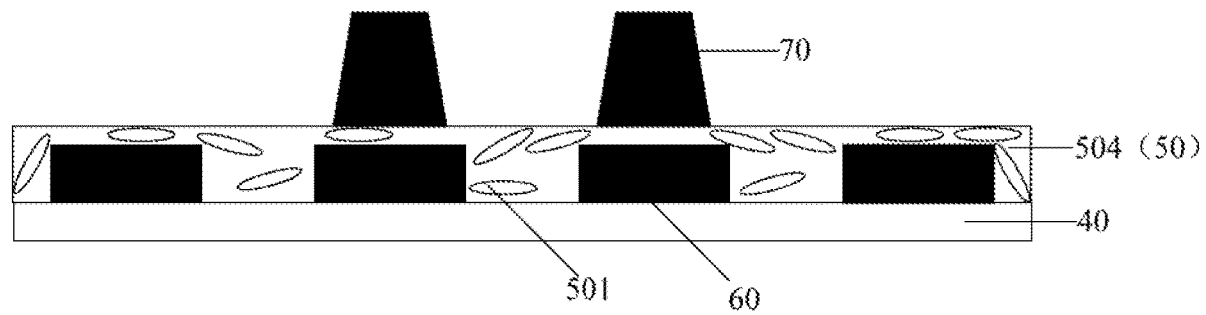
FIG. 11 is a schematic structural diagram of forming a photo spacer on a planarization layer according to one embodiment of the present disclosure.

In some embodiments, the pattern layer 60 is a black matrix pattern. After the planarization layer 50 is cleaned with a cleaning solution, and the cleaning solution reacts with the hydrophobic polymer to remove a part or all of the first sub-planarization layer 503, the preparation method of the display substrate further includes the following:

As shown in FIG. 11, a photo spacer 70 (PS) is formed, and a boundary of the orthographic projection of the PS 70 on the base substrate 40 is located within a boundary of the orthographic projection of the black matrix pattern on the base substrate 40.

Here, a film may be formed on the planarization layer 50, and then the film is patterned by a mask exposure and development process to form the PS 70.

In the embodiment of the present disclosure, when the display substrate is applied to the display apparatus, the PS 70 is formed on the planarization layer 50, and the PS 70 can keep the display apparatus to maintain a certain thickness.

In some embodiments, before S100, the method for preparing the display substrate further includes forming a transparent conductive film on the base substrate 40.

Here, the material of the conductive film may be, for example, Indium Tin Oxides (ITO) or Indium Zinc Oxide (IZO).

Further, the conductive film and the pattern layer 60 may be formed on the same side of the base substrate 40 or two opposite sides of the base substrate 40 respectively.

In the embodiment of the present disclosure, the transparent conductive film is formed on the base substrate 40, which can function to discharge static electricity.

One Embodiment of the present disclosure provides a display substrate, which is prepared by using the above-described method for preparing a display substrate according to one embodiment of the present disclosure.

It should be noted that the display substrate provided by the embodiment of the present disclosure can be applied to a liquid crystal display apparatus (LCD) or an organic light-emitting diode (OLED) display apparatus. Of course, it can also be applied to other types of display apparatus, which is not limited thereto. When the display substrate is applied to a liquid crystal display apparatus, the display substrate can be applied to a single-layer display panel or to a Mono Cell in a Dual Cell (dual-layer display panel).

Embodiments of the present disclosure provide a display substrate, which has the same structural and advantageous effects as the method for preparing the display substrate provided in the above embodiments. Since the structural and advantageous effects of the method for preparing the display substrate have been described in the above embodiments, the details thereof are not repeated here.

Some embodiments of the present disclosure also provide a display apparatus including the above display substrate according to one embodiment of the present disclosure.

Wherein, the display apparatus may be any apparatus that displays an image regardless of motion (eg, video) or fixed (eg, still image) and regardless of text or image. More specifically, it is contemplated that the described embodiments can be implemented in or associated with a variety of electronic apparatus such as, but not limited to, mobile phones, wireless apparatus, personal data assistants (PDAs), handheld or portable computer, GPS receiver/navigator, camera, MP4 video player, video camera, game console, watch, clock, calculator, TV monitor, planarization panel display, computer monitor, car monitor (for example, Odometer display, etc.), navigator, cockpit controller and/or display, camera view display (eg, rear view camera display in vehicle), electronic photo, electronic billboard or signage, projector, building structure, packaging and aesthetic structure (for example, a display for an image of a piece of jewelry), etc.

Further, the display apparatus may also be a display panel.

Here, the display apparatus may be a liquid crystal display apparatus; or may be an organic electroluminescent diode display apparatus, of course, other types of display apparatus may be used, which are not limited thereto.

One embodiment of the present disclosure provides a display apparatus including the above-mentioned display substrate, and the display substrate has the same structural and advantageous effects as the method for preparing the display substrate provided in the above embodiment, which are not repeated herein.

The principles and the embodiments of the present disclosure are set forth in the specification. The description of the embodiments of the present disclosure is only used to help understand the apparatus and method of the present disclosure and the core idea thereof. Meanwhile, for a person of ordinary skill in the art, the disclosure relates to the scope of the disclosure, and the technical scheme is not limited to the specific combination of the technical features, but also covers other technical schemes which are formed by combining the technical features or the equivalent features of the technical features without departing from the inventive concept. For example, a technical scheme may be obtained by replacing the features described above as disclosed in this disclosure (but not limited to) with similar features.

What is claimed is:

1. A method of preparing a display substrate, comprising:
   forming a pattern layer on a base substrate;
   forming a planarization layer on the pattern layer, the planarization layer comprising a host material and a hydrophilic material and a hydrophobic material mixed in the host material;
   treating the planarization layer so that the host material reacts with the hydrophilic material to form a hydrophilic polymer, the host material reacts with the hydrophobic material to form a hydrophobic polymer, and the planarization layer being delaminated to form a first sub-planarization layer and a second sub-planarization layer; and
   cleaning the planarization layer with a cleaning solution that reacts with the hydrophobic polymer to remove at least part of the first sub-planarization layer,
   wherein the first sub-planarization layer comprises the hydrophobic polymer, and the second sub-planarization layer comprises the hydrophilic polymer.

2. The method of preparing a display substrate of claim 1, wherein the first sub-planarization layer is stacked on the second sub-planarization layer, and the second sub-planarization layer is closer to the base substrate than the first sub-planarization layer.

3. The method of preparing a display substrate of claim 1, wherein a thickness of the second sub-planarization layer is greater than or equal to a thickness of the pattern layer.

4. The method of preparing a display substrate of claim 1, wherein, before the planarization layer is cleaned with the cleaning solution, a ratio of a maximum thickness of the second sub-planarization layer and a maximum thickness of the first sub-planarization layer is about 1:4.

5. The method of preparing a display substrate of claim 1, wherein the planarization layer is formed on the pattern layer by a coating technique.

6. The method of preparing a display substrate of claim 1, wherein the host material comprises polyimide.

7. The method of preparing a display substrate of claim 1, wherein the hydrophilic material includes a carboxyl group.

8. The method of preparing a display substrate of claim 1, wherein the hydrophilic polymer has a molecular structure as follows:

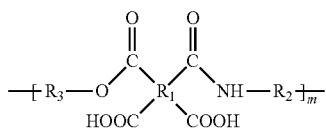

wherein in is an integer, and m≥2, $R_1$, $R_2$, and $R_3$ have a chemical structure as below:

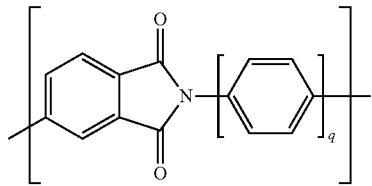

wherein q is an integer in a range of 1 to 8.

9. The method of preparing a display substrate of claim 1, wherein the hydrophobic material includes an alkyl group.

10. The method of preparing a display substrate of claim 1, wherein the hydrophobic polymer has a molecular structure as follows:

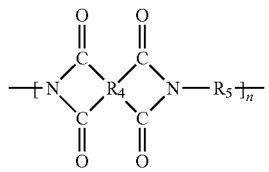

wherein n is an integer and n≥2, $R_4$ and $R_5$ have a chemical structure as below:

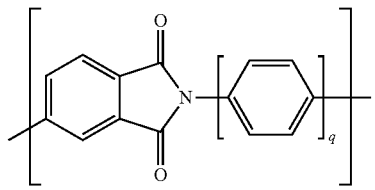

wherein q is an integer in a range of 1 to 8.

11. The method of preparing a display substrate of claim 1, wherein treating the planarization layer comprises heating the planarization layer at a temperature within a range from about 210° C. to about 250° C.

12. The method of preparing a display substrate of claim 1, wherein the cleaning solution comprises sodium dodecyl benzene sulfonate.

13. The method of preparing a display substrate of claim 1, wherein the hydrophilic material and the hydrophobic material are randomly distributed in the host material.

14. The method of preparing a display substrate of claim 1, wherein the pattern layer comprises a black matrix pattern, and after the planarization layer is cleaned with the cleaning solution that reacts with the hydrophobic polymer to remove at least part of the first sub-planarization layer, the method of preparing the display substrate further comprises:
forming a photo spacer,
wherein a boundary of orthographic projection of the photo spacer on the base substrate is within a boundary of orthographic projection of the black matrix pattern on the base substrate.

15. The method of preparing a display substrate of claim 1, further comprising, before forming the pattern layer on the base substrate, forming a transparent conductive film on the base substrate.

16. A display substrate prepared by the method for preparing a display substrate according to claim 1.

17. A display apparatus, comprising the display substrate of claim 16.

* * * * *